United States Patent [19]

de Nora et al.

[11] 4,236,979

[45] Dec. 2, 1980

[54] COMPOSITE DIAPHRAGMS AND PROCESS FOR ELECTROLYZING ALKALI METAL CHLORIDE

[75] Inventors: Oronzio de Nora; Luigi Giuffrè; Giovanni Modica, all of Milan, Italy

[73] Assignee: Oronzio de Nora Impianti Elettrochimici S.p.A., Milan, Italy

[21] Appl. No.: 50,983

[22] Filed: Feb. 22, 1979

Related U.S. Application Data

[62] Division of Ser. No. 13,830, Feb. 22, 1979, Pat. No. 4,186,076.

[51] Int. Cl.$^3$ .................. C25B 1/34; C25B 13/04; C25B 13/08
[52] U.S. Cl. ...................... 204/98; 204/128; 204/295; 204/296
[58] Field of Search ............ 204/98, 128, 296, 295

[56] References Cited

U.S. PATENT DOCUMENTS

| | | | |
|---|---|---|---|
| 4,036,729 | 7/1977 | Patil et al. | 204/296 |
| 4,056,447 | 11/1977 | Gluffre et al. | 204/296 |

*Primary Examiner*—R. L. Andrews
*Attorney, Agent, or Firm*—Hamond & Littell, Weissenberger and Muserlian

[57] ABSTRACT

Porous and electrolyte permeable composite diaphragms for electrolysis cells comprising a chemically inert, fibrous porous matrix or substrate impregnated with a copolymer of divinylbenzene and at least one member of the group consisting of 2-vinylpyridine and 4-vinylpyridine, method of electrolysis of an electrolyte using the said diaphragms and an electrolysis cell containing said diaphragms.

16 Claims, No Drawings

COMPOSITE DIAPHRAGMS AND PROCESS FOR ELECTROLYZING ALKALI METAL CHLORIDE

PRIOR APPLICATION

This application is division of our copending application Ser. No. 13,830 filed Feb. 22, 1979, now U.S. Pat. No. 4,186,076.

STATE OF THE ART

In diaphragm cells for the production, for example, of chlorine and caustic soda from brine; the anodic compartment is separated from the cathodic compartment by a porous separator permeable to the electrolyte flow to keep the anodic gas (chlorine) separated from the cathodic gas (hydrogen) and to maintain the difference in pH existing between the anolyte and catholyte.

Asbestos, particularly chrysotile asbestos which is characterized by a tubular fiber structure and the formula 3 MgO.2SiO$_2$. 2H$_2$O has been, and still is, utilized for producing said diaphragms due to its particular property of resistance either in acidic environment or in strongly alkaline environment. However, the said diaphragms are not dimensionally stable and tend to swell in the cell, sometimes up to 100%, getting so close to the anodic surface as to undergo an erosive action of chlorine gas bubbles evolved at the anode. Such disintegrative action strongly affects the operating life of the diaphragms which is reduced to about 4 to 10 months, while the dimensionally stable anodes such as valve metal anodes with an electrocatalytic coating can operate for years. This means the replacement of the diaphragms several times during the anode lifetime with the consequent production losses and considerable expenses.

Recently, several attempts have been made to improve the mechanical stability of asbestos diaphragms by impregnating the asbestos with soluble resins which could be bonded to the asbestos by a subsequent evaporation of the solvent and thermal treatment. These attempts did not turn out in a satisfactory result because the capillary structure of the asbestos acts as a filter for the bulky polymeric molecules so that impregnation is difficult and scarcely uniform and therefore, the permeability and porosity are not uniform and not easily reproducible.

Another attempt at stabilizing asbestos diaphragms consists in codepositing asbestos fibers and preformed thermoplastic polymeric fibers or powder followed by a thermal treatment. This involves several problems because the high temperatures (200°–350° C.) necessary for the sinterization causes distortion of the metallic cathodic structure if a peculiar morphology of the same is not adopted, and a thermal degradation of the asbestos with formation of sodium silicate.

Recently, U.S. Pat. No. 4,020,235 has proposed reinforcement of diaphragms by copolymerization in situ of styrene and divinylbenzene followed by sulfonation of the copolymer in liquid sulfur dioxide at low temperatures (−10° C.) and chlorination to make the polymer wettable and stable. Sulfonation of the formed copolymer is necessary because, otherwise, the copolymer impregnated diaphram would be highly hydrophobic and would not permit an even flow of electrolyte through it. However, this technique is both laborious and costly.

OBJECTS OF THE INVENTION

It is a primary object of the invention to provide a novel composite diaphragm material comprising a matrix of fibrous inert material impregnated with an unsulfonated copolymer which is wettable by the electrolyte and which remains dimensionally stable for long periods at the conditions of electrolysis.

It is another object of the invention to provide a novel process for the preparation of the composite diaphragm material.

It is a further object of the invention to provide an improved method of electrolysis of alkali metal halides in a diaphragm cell provided with the diaphragm of the invention.

It is an additional object of the invention to provide a novel electrolysis cell equipped with the novel diaphragm.

These and other objects and advantages of the invention will become obvious from the following detailed description.

THE INVENTION

The novel porous and electrolyte permeable composite diaphragms of the invention are comprised of a chemically inert, fibrous porous matrix or substrate impregnated with a copolymer of divinylbenzene and at least one member of the group consisting of 2-vinylpyridine and 4-vinylpyridine. Preferably, the copolymer is directly formed on the inert fibrous substrate in the absence of a solvent.

The advantages of the composite diaphragms of the invention are their great resistance to mechanical abrasion caused by brine flow and by chlorine bubbles. Their dimensional stability allows th inner diaphragms and smaller interelectrodic distances with a considerable saving of electric energy. Moreover, because the distance between the anode side of the diaphragm and the active surface may be accurately preset and is thereafter maintained, a better faraday efficiency together with a reduction of chlorate concentration in the catholyte is obtained even when operating with a higher caustic soda concentration in the catholyte.

Preferably, the inert fibrous material is asbestos paper or asbestos mat, such as that produced by pulling a slurry of asbestos fibers through a foraminous metal electrode, but other fibrous inert materials may be used such as polyester fibers in the form of woven or unwoven felt or cloth and woven or unwoven carbon fiber felts.

The ratio of divinylbenzene to the vinylpyridine is 1/16 to 1/1, preferably between 1 to 9 and 2 to 3. The composite diaphragm preferably contains 5 to 25% by weight of the final diaphragm of the said copolymer, most preferably 8 to 16% by weight.

It has unexpectedly been found that by impregnating, for example, asbestos paper with the said copolymer, the asbestos is made exceptionally stable and swelling and disintegration under the normal conditions of electrolysis of alkali metal halide brines are effectively prevented. On the other hand, the diaphragm remains porous and permeable to brines up to a copolymer loading of about 25% of the total weight of the composite material. The copolymer loading does not appear to make the fibrous matrix hydrophobic but rather it enhances its hydrophilic properties, making the composite material perfectly wettable by the electrolyte. It is believed that the pyridine group, particularly in alkaline environments such as the occurring within the diaphragm in chlor-alkali cells, behaves as a negatively polarized group, because of the electron pair on the nitrogen atom thereof.

The novel method of the invention for the preparation of the composite diaphragm material comprises impregnating the inert fibrous matrix with a solution of 2.5 to 50% by volume of 2- and/or 4-vinylpyridine and divinylbenzene in an organic solvent such as benzene, toluene, xylene, acetone, etc. in a molar ratio of 16:1 to 1:1, preferably 9:1 to 3:2, preferably containing 0.1 to 5%, most preferably about 1%, mole of a suitable polymerization initiator such as benzoylperoxide, or azobisisobutyronitrile, evaporating the organic solvent, preferably at room temperature and under reduced pressure, heating the dried impregnated matrix at 75° to 100° C., preferably at 80° to 90° C. for a time sufficient to effect polymerization such as 2 to 4 hours under an inert atmosphere such as nitrogen, and washing the composite material with the organic solvent to remove unreacted monomers and low molecular weight copolymer.

The in situ copolymerization in the absence of an organic solvent produces a substantially uniform coating of the fibrous matrix and a strong bonding together of the fibers due to copolymer bridging between fibers resulting in an exceptionally strong material excellent resistance to swelling and erosion.

Permeability, porosity and wettability of the composite diaphragms prepared by the process of the present invention are prefectly reproducible characteristics which can be controlled by varying parameters such as the temperature and the time of polymerization and most of all, the concentration of the monomers in the soaking solution and their relative ratios. The soaking solution may preferably contain from 10 to 25% of monomers and most preferably from 15 to 20% and the molar ratio (2) or (4) vinylpyridne/divinylbenzene may range from 16/1 to 1/1 and preferably from 9/1 to 3/2, giving to the copolymer an optimum cross-linking degree for good chemical resistance and sufficient hydrophilic properties to be wettable by the electrolyte.

The composite diaphragms of the invention are particularly useful in the electrolysis of alkali metal halide brines to produce the halogen and the alkali metal hydroxide such as chlorine and caustic soda but may also be used in other electrolysis reactions.

The novel electrolytic process of the invention for the preparation of a chemical product comprises providing an electrolyte containing the elements of the product to be produced in a electrolytic cell with an anode and a cathode separated by a porous, electrolyte permeable composite diaphragm made of chemical inert, fibrous porous matrix or substrate impregnated with a copolymer of divinylbenzene and at least one member of the group consisting of 2-vinylpyridine and 4-vinylpyridine, passing an electrolysis current through the anode, cathode and electrolyte and recovering said chemical product from the said cell.

The novel electrolytic cell of the invention comprises a cell housing containing at least one anode and at least one cathode forming an interelectrodic gap with a porous, electrolyte permeable diaphragm of the invention separating the anode and cathode.

As a modification of the membrane of the invention, the polymers may contain up to 30/40% molar percent of 1 or more other polymerizable monomers such as vinylacetate, methylmethacrylate or styrene.

Divinylbenzene has the formula

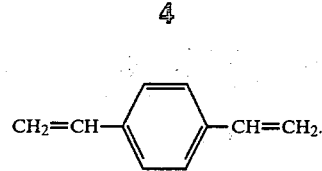

In the following examples there are described several embodiments to illustrate the invention.

However, it is to be understood that the invention is not intended to be limited to the specific embodiments.

EXAMPLE 1

38 g of methylcellulose and 80 mg of antifoam surfactant were dissolved in 7800 ml of water and 52 g of asbestos fibers 3 T and 104 g of asbestos fibers 4 T (Quebec Producers' Association Quebec Screen Test Classification) were added to the solution, which had a viscosity of 35 cps at 22.8° C. The slurry thus obtained was thoroughly stirred for half an hour by compressed air injection. A steel mesh cathode of 220×330 mm provided with a chamber wherein an outlet was connected to a suction system was immersed in the slurry and then an increasing vacuum up to 690 mm Hg was applied thereto. 5.5 liters of slurry were drawn onto and through the cathodic structure resulting in the formation of a mat of 14 g/dm$^2$ of asbestos fibers. Several coated cathodes were prepared by this procedure.

The coated cathodic structures were then dried at 100° C. for three hours and were then soaked at room temperature in benzene solutions of 4-vinylpyridine and divinylbenzene at different concentrations and with different molar ratios of the monomers, as indicated in Table I. The solutions also contained dibenzoyl peroxide as polymerization initiator of 1% molar with respect to the moles of the monomers. After evaporating the solvent under vacuum at room temperature, the exposed surfaces of the supporting cathodes were washed with benzene to avoid coating of the cathodic surfaces with the copolymer.

The cathode assemblies were then heated in a closed reactor designed to reduce to the minimum the space for the gas, at 80° C. for three hours. After cooling, they were washed with benzene to remove possible unreacted monomers. The diaphragms, after drying, were weighed to determine the increase in weight of different amounts of 4-vinylpyridine/divinylbenzene copolymer as shown in Table I. They were then tested in pilot diaphragm cells for the electrolysis of sodium chloride, operating at the following conditions:

| anode | titanium mesh activated with mixed oxides of titanium and ruthenium |
|---|---|
| brine feed | 310 g/l of sodium chloride |
| current density | 2000 A/m$^2$ |
| temperature | 80° C. |

Caustic concentration in the catholyte was constantly kept at 160 g/l by suitably varying the anolyte heads on the diaphragms. After 1000 hours of continuous operation, the following results were obtained, as a function of the copolymeric load on the diaphragms and the molar ratio of monomers, as illustrated in Table I.

TABLE I

| Run | % weight increase due to copolymer | Molar ratio of 4VP/DVB | Cell Voltage (V) | % Cathodic Current Efficiency | State of Diaphragm at end of run |
|---|---|---|---|---|---|
| 1 | 5 | 9:1 | 3.2 | 92 | slight swelling |
| 2 | 9 | 9:1 | 3.25 | 92 | very slight swelling |
| 3 | 10 | 9:1 | 3.28 | 92.5 | very slight swelling |
| 4 | 10 | 6:1 | 3.3 | 94 | no swelling |
| 5 | 10 | 4:1 | 3.35 | 92.5 | no swelling |
| 6 | 20 | 9:1 | 3.7 | 93 | no swelling |

As can be seen from Table I, copolymer weight increases from 5 to 20% of the total weight of the diaphragm are effective in rendering it dimensionally stable, with elevated cathodic current efficiencies and not exceedingly high cell voltages.

EXAMPLE 2

A piece measuring 120×120 mm was cut from an asbestos sheet type 0.025 "L/FX 36" [produced by John Mainville & Co.] and it was soaked in a solution having the following composition by volume at 20° C.

| | |
|---|---|
| 2-vinylpyridine + divinylbenzene-9-1 molar ratio | 17% |
| toluene | 83% |
| 1% molar of azobisisobutyronitrile (polymerization initiator) with respect to the amount of moles of 2-vinylpyridine and divinylbenzene | |

Using the technique of Example 1, the soaked asbestos sheet was heated in a reactor, with empty spaces reduced to the minimum, for 1 hour at 80° C. After cooling and flushing with toluene, the composite diaphragm showed a content of copolymer of 8.5% of its total weight. It was then tested in a diaphragm pilot cell for the electrolysis of sodium chloride having the following characteristics:

| | |
|---|---|
| anode | titanium mesh activated with mixed oxides of titanium and ruthenium |
| cathode | carbon steel mesh |
| feed brine | 310 g/l of sodium chloride |
| current density | 2000 A/m$^2$ |
| temperature | 75–80° C. |
| interelectrodic gap | 4 mm |

These parameters were kept constant while the anolyte flow through the diaphragm was varied by varying the hydraulic pressure on the anode side with respect to the cathode side and the following values of cathodic current efficiency, as a function of the sodium hydroxide concentration in the catholyte were obtained:

TABLE II

| Cathodic efficiency | NaOH concentration in the catholyte |
|---|---|
| 97 | 100 g/l |
| 94.5 | 130 g/l |
| 92.5 | 150 g/l |
| 90 | 170 g/l |
| 89.5 | 200 g/l |
| 82 | 220 g/l |

The cell voltage during the entire duration of the test varied from 3.2 to 3.4 V.

EXAMPLE 3

Using the procedure of Example 2, a series of identical asbestos papers; 0.025 "L/FX 36" type made by John Mansville Co. were soaked with toluene solutions of 4-vinylpyridine and divinylbenzene at various concentrations and with different molar ratios of monomers to obtain diaphragms loaded with different copolymeric loadings as reported in Table III. The diaphragms were separately tested over a period of three weeks in chlor-alkali diaphragm cells, operating at the following conditions:

| | |
|---|---|
| anode | titanium mesh activated with mixed oxides of titanium and ruthenium |
| cathode | carbon steel mesh |
| feed brine | 310 g/l of sodium chloride |
| current density | 2000 A/m$^2$ |
| temperature | 80° C. |
| interelectrodic gap | 4 mm |
| anolyte head | from 60 to 120 cm |
| NaOH concentration in catholyte | 100 g/l |

Cell voltages and cathode current efficiencies as the result of the test are comparatively reported in Table III for each diaphragm as a function of the copolymer loading thereon and the relative ratio of comonomers:

TABLE III

| Copolymer loading | molar ratio 4VP/DVB | Cell voltage (V) | Cathode Current Efficiency (%) | State of diaphragm at end of test |
|---|---|---|---|---|
| 5% | 16:1 | 3.2 | 95 | slight swelling |
| 5% | 1:1 | 3.2 | 95 | very slight swelling |
| 10% | 16:1 | 3.1 | 95 | no swelling |
| 10% | 1:1 | 3.2 | 97 | no swelling |
| 25% | 16:1 | 5.1 | 94 | no swelling |
| 25% | 1:1 | 6.2 | 96 | no swelling |

When the loading of copolymer reaches approximately 25% by weight, the diaphragm looses much of its permeability causing a rapid increase of the cell voltage. When the loading of copolymer approaches 5%, the asbestos paper maintains a certain tendency to swell although in much reduced measure than an unloaded asbestos paper.

Various modifications of the method and processes of the present invention may be made without departing from the spirit or scope thereof. In particular, modifications as regards, for example, the type of solvent and polymerization initiator or the type of fibrous matrix, either natural or synthetic, will be obvious to the skilled in the art. It must be understood that the invention is not to be limited in any way by the aforesaid examples, but is limited only as defined in the following appended claims.

What is claimed:

1. An electrolytic process for the electrolysis of a solution of an alkali metal halide comprising providing an electrolyte containing an alkali metal halide in an electrolytic cell with an anode and a cathode separated by a porous, electrolyte permeable composite diaphragm comprising a chemically inert fibrous porous matrix or substrate impregnated with a copolymer of divinylbenzene and at least one member of the group consisting of 2-vinylpyridine and 4-vinylpyridine, passing an electrolysis current through the anode, cathode and electrolyte and recovering electrolysis products from the cell.

2. The process of claim 1 wherein the inert fibrous material is asbestos.

3. The process of claim 1 wherein the amount of copolymer is from 5 to 25% by weight of the composite diaphragm.

4. The process of claim 1 wherein the molar ratio between vinylpyridine and divinylbenzene is between 16/1 and 1/1.

5. The process of claim 1 wherein the copolymer was directly polymerized on the substrate in the absence of a solvent.

6. The process of claim 1 wherein the ratio of vinylpyridine to divinylbenzene is between 9 to 1 and 3 to 2.

7. The process of claim 1 wherein the weight of the copolymer was 8 to 16% by weight.

8. The process of claim 1 wherein 4-vinylpyridine is used.

9. The process of claim 1 wherein the electrolyte is aqueous sodium chloride and chlorine is the recovered product.

10. A process for the preparation of a porous, electrolyte permeable composite diaphragm comprising a chemically inert fibrous porous matrix or substrate impregnated with a copolymer of divinylbenzene and at least one member of the group consisting of 2-vinylpyridine and 4-vinylpyridine comprising impregnating the inert fibrous matrix with a solution of 2.5 to 50% by volume of 2- and/or 4-vinylpyridine and divinylbenzene in an organic solvent in a molar ratio of 16:1 to 1:1 containing 0.1 to 5% mole of a suitable polymerization inhibitor, evaporating the organic solvent, heating the dried impregnated matrix at 70° to 100° C. for a time sufficient to effect polymerization under an inert atmosphere, and washing the composite material with the organic solvent to remove unreacted monomers and low molecular weight copolymer.

11. The process of claim 10 wherein the inert fibrous material is asbestos.

12. The process of claim 10 wherein the amount of copolymer is from 5 to 25% by weight of the composite diaphragm.

13. The process of claim 10 wherein the molar ratio between vinylpyridine and divinylbenzene is between 16/1 and 1/1.

14. The process of claim 10 wherein the ratio of vinylpyridine to divinylbenzene is between 9 and 1 and 3 to 2.

15. The process of claim 10 wherein the weight of the copolymer was 8 to 16% by weight.

16. The process of claim 10 wherein 4-vinylpyridine is used.

* * * * *

UNITED STATES PATENT AND TRADEMARK OFFICE
CERTIFICATE OF CORRECTION

PATENT NO. : 4,236,979

DATED : December 2, 1980

INVENTOR(S) : Oronzio De Nora et al

It is certified that error appears in the above—identified patent and that said Letters Patent is hereby corrected as shown below:

Column 3, line 1: "such" as the" should read

-- such as that --.

line 26: before "excellent" insert -- with --.

Signed and Sealed this

Twenty-eighth Day of April 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,236,979

DATED : Dec. 2, 1980

INVENTOR(S) : Oronzio deNora et al

It is certified that error appears in the above-identified patent and that said Letters Patent is hereby corrected as shown below:

On the Title Page, Item [30] add:

Foreign Application Data

-- March 1, 1978   Italy          20,792 A/78--

Signed and Sealed this

Tenth Day of March, 1987

*Attest:*

DONALD J. QUIGG

*Attesting Officer*   *Commissioner of Patents and Trademarks*